United States Patent [19]

Miller et al.

[11] Patent Number: 5,221,973

[45] Date of Patent: Jun. 22, 1993

[54] METHOD AND APPARATUS FOR EXERCISING DIAGNOSTIC FUNCTIONALITY IN PRODUCT EXTENSIONS

[75] Inventors: William G. Miller, Fairport; David J. Sweet, Rochester, both of N.Y.

[73] Assignee: Xerox Corporation, Stamford, Conn.

[21] Appl. No.: 589,828

[22] Filed: Sep. 24, 1990

[51] Int. Cl.⁵ .................... H04N 1/32; H04N 1/00; G03G 21/00
[52] U.S. Cl. ............................ 358/468; 358/401; 358/406; 355/205
[58] Field of Search ............... 358/468, 400, 401, 406, 358/434, 437, 442; 355/202, 203, 204, 205, 206, 207

[56] References Cited

U.S. PATENT DOCUMENTS

| | | |
|---|---|---|
| 4,167,322 | 9/1979 | Yano et al. ............................ 355/204 |
| 4,454,575 | 6/1984 | Bushaw et al. ........................ 358/468 |
| 4,583,834 | 4/1986 | Seko et al. ............................ 355/206 |
| 4,882,778 | 11/1989 | Hosaka et al. ........................ 364/187 |
| 4,884,103 | 11/1989 | Yamada ................................ 355/200 |
| 5,021,827 | 6/1991 | Komiya et al. ........................ 355/205 |
| 5,057,866 | 10/1991 | Hill, Jr. et al. ........................ 355/205 |
| 5,084,875 | 1/1992 | Weinberger et al. .................. 355/205 |

Primary Examiner—Edward L. Coles, Sr.
Assistant Examiner—Thomas D. Lee
Attorney, Agent, or Firm—Duane C. Basch

[57] ABSTRACT

A reprographic system having one or more peripheral devices or subsystems whose function is integrated therewith, including a communications link between the reprographic system and peripheral devices. Furthermore, the reprographic system would have the capability to determine the configuration of electromechanical components contained within the peripheral devices, as well as, the status or control states of the components.

4 Claims, 8 Drawing Sheets

METHOD AND APPARATUS FOR EXERCISING DIAGNOSTIC FUNCTIONALITY IN PRODUCT EXTENSIONS

BACKGROUND OF THE INVENTION

1. Field of the Invention

The present invention relates generally to a system for diagnosing a malfunction within a machine, and more specifically to the investigation or analysis of a problem in a subsystem associated with an electrophotographic machine.

2. Description of the Prior Art

It is a generally known practice to utilize component exercising routines and other diagnostic functions within reprographic and printing systems to aid in the troubleshooting of such systems. For example, U.S. Pat. No. 4,882,778 to Hosaka et al. discloses an electronic load drive control apparatus with intelligent registers and a microprocessor which can execute control under predetermined conditions. The apparatus is simplified by a control unit, a program design and structure which utilizes an intelligent microcontroller. The microcontroller transmits information by an interrupt procedure to a microcomputer only when a control tolerance is reached. The microcomputer performs tasks and is capable of increasing the number of systems to be controlled.

U.S. Pat. No. 4,884,103 to Yamada discloses a programmed control device which is capable of connecting an external memory to a microcomputer. The control device and the external memory are then utilized to alter the main routine which is then usable instead of the unaltered main routine. Subsequently, the altered main routine may be used to operate the machine in conjunction with the external device, in accordance with the specifications and function of the external device.

However, what is not disclosed in the cited references is the ability to troubleshoot or diagnose problems in add-on or peripheral subsystems which may have been subsequently integrated with the base machine. For example, the add-on sorter subsystem disclosed by Yamada (U.S. Pat. No. 4,884,103), does not teach the use of the external memory for any diagnostic functionality. Moreover, the approach disclosed by Yamada would require the external subsystem to incorporate additional memory to alter the main routine of the base system. In addition, a full bus structure would need to be available for connection with the add-on system in order to provide memory access for the base system.

It is therefore an object of the present invention to provide a base machine with means for exercising the diagnostic functionality of a peripheral device or subsystem. It is a further object of the present invention, that the base machine will require no prior knowledge of the diagnostic functionality of the subsystem in order to provide an interface to that diagnostic functionality. It is yet another object of the present invention to utilize a common interface for the communication of diagnostic information between the base machine and all peripheral devices. It is a final object of the present invention to provide a common diagnostic user interface for any peripheral or add-on subsystem integrated with the base machine so as to enhance the serviceability of the entire system.

Further advantages of the present invention will become apparent as the following description proceeds and the features characterizing the invention will be pointed out with particularity in the claims annexed to and forming a part of this specification.

SUMMARY OF THE INVENTION

A reprographic system having one or more peripheral devices or subsystems whose function is integrated therewith, including a communications link between the reprographic system and peripheral devices. Furthermore, the reprographic system would have the capability to determine the configuration of electromechanical components contained within the peripheral devices, as well as, the status or control states of the components.

BRIEF DESCRIPTION OF THE DRAWINGS

For a better understanding of the present invention, reference may be had to the accompanying drawings wherein the same reference numerals have been applied to like parts and wherein.

DESCRIPTION OF THE PREFERRED EMBODIMENT

Figure 1A:
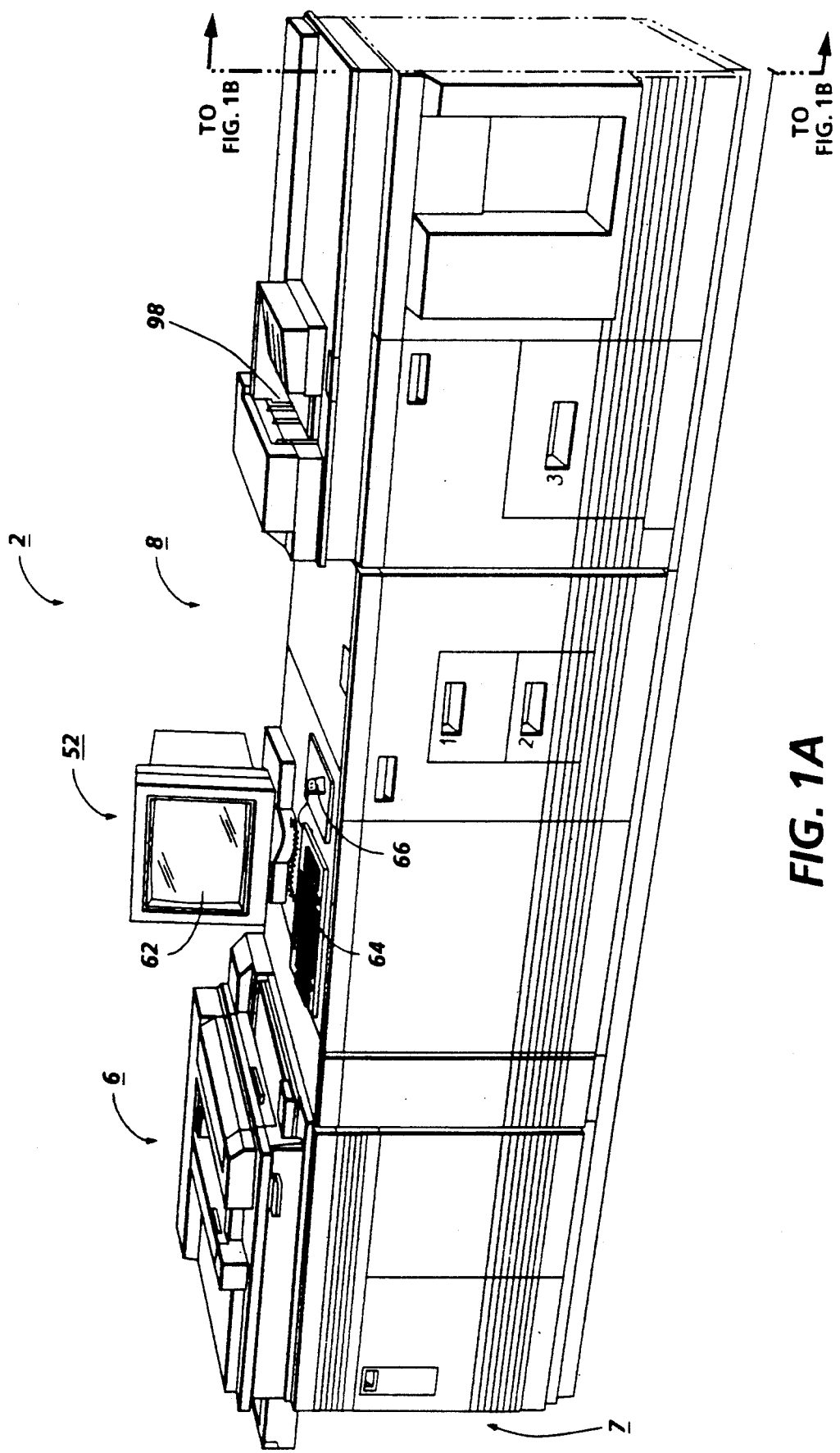
FIGS. 1A and 1B depict an electronic printing system incorporating the present invention.
Figure 1B:
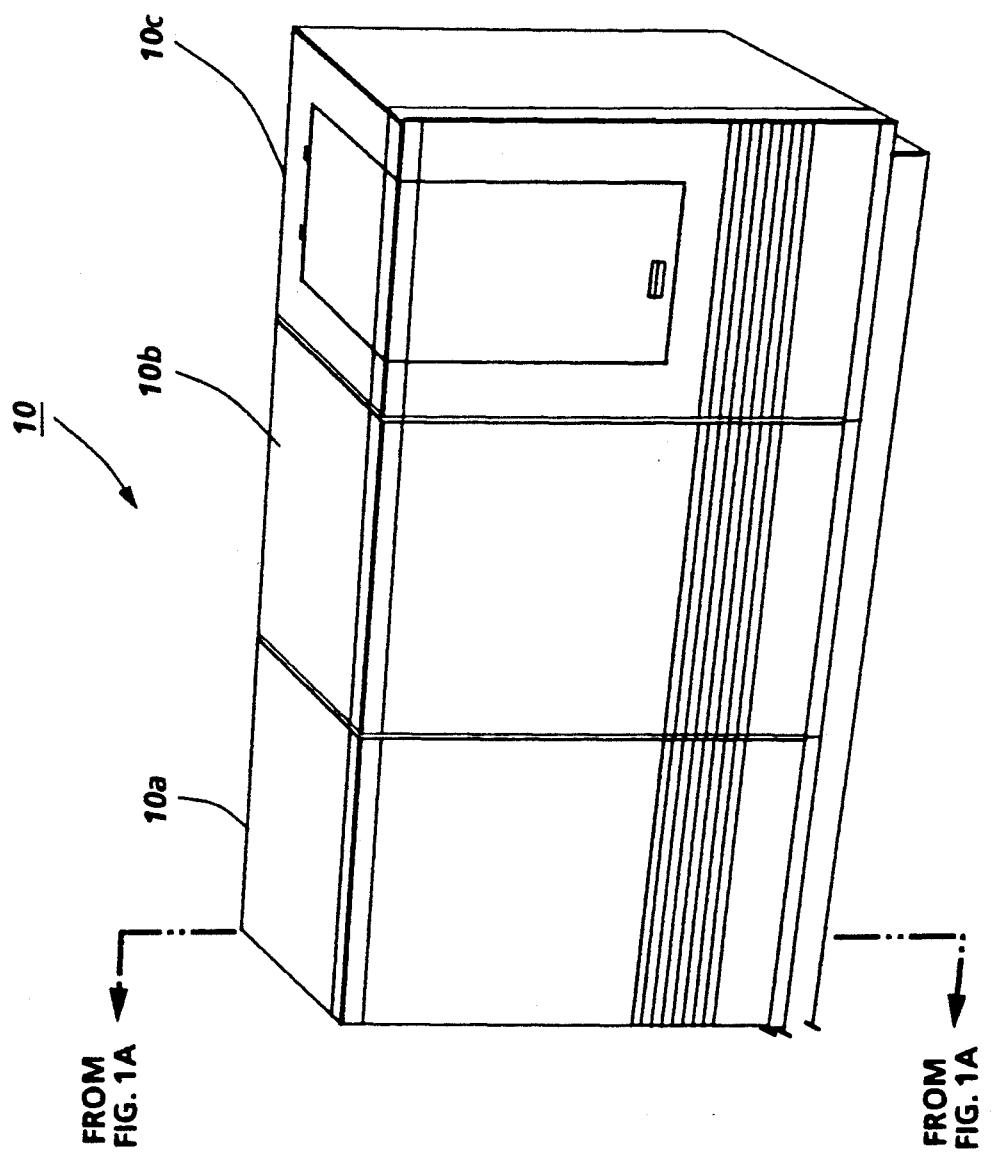

Referring to FIGS. 1A and 1B, there is shown an exemplary laser based printing system 2 for processing print jobs. Printing system 2 for purposes of explanation is divided into a scanner section 6, controller section 7, printer section 8, and document finisher section 10. While a specific printing system is shown and described, the present invention may be used with other types of electromechanical or reprographic systems.

Figure 2:
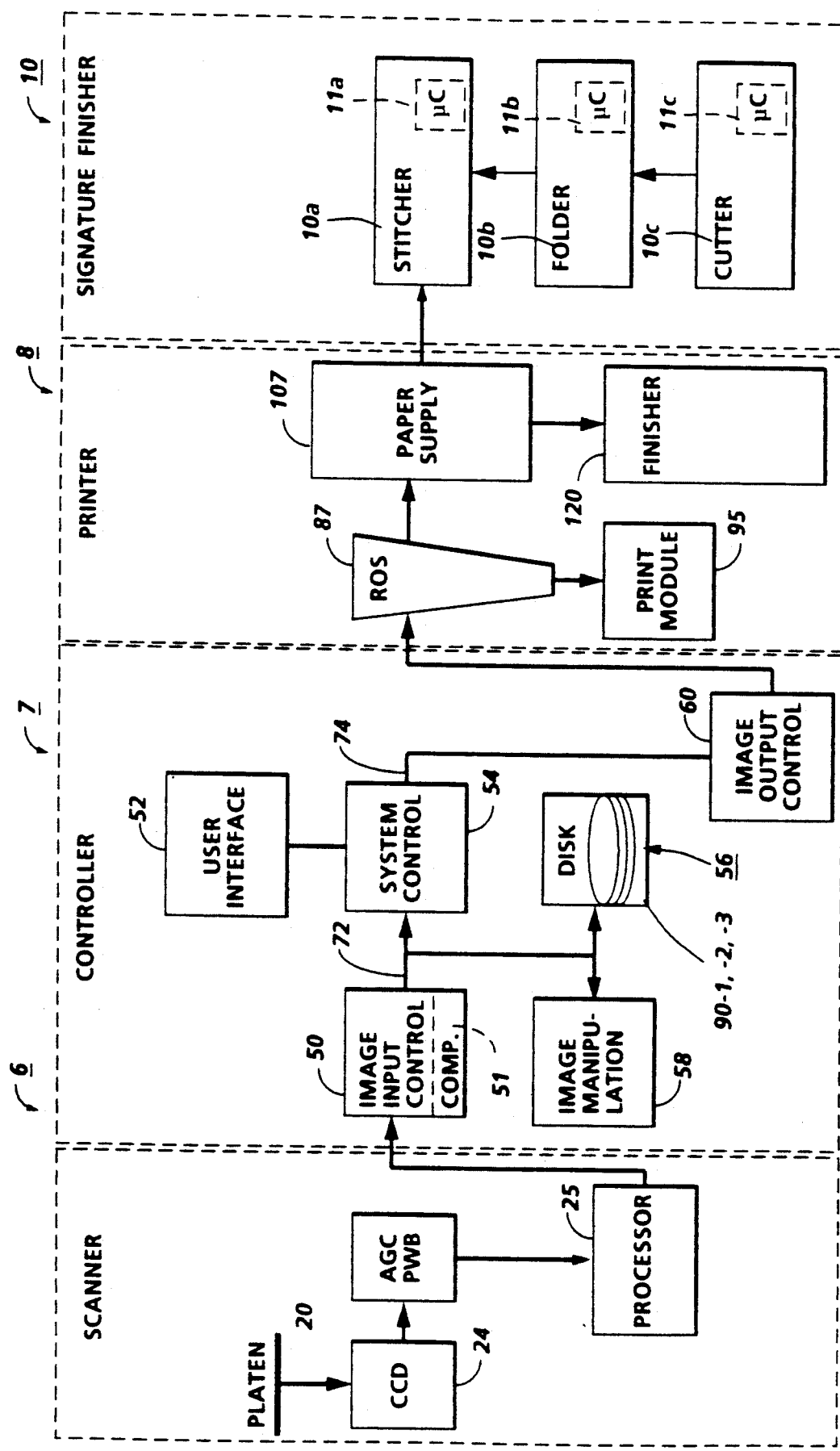
FIG. 2 is a block diagram depicting the major elements of the printing system shown in FIGS. 1A and 1B.

Referring particularly to FIG. 2, scanner section 6 incorporates a transparent platen 20 on which documents to be scanned would be located. One or more linear arrays 24 provide image signals or pixels representative of the image scanned which after suitable processing by processor 25, are output to controller section 7.

Processor 25 converts the analog image signals output by array 24 to digital image signals, subsequently processing the signals, as required, to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents to be scanned may be located on platen 20 for scanning by an automatic document handler (ADF) operable in either a Recirculating Document Handling (RDH) mode or a Semi-Automatic Document Handling (SADH) mode. A manual mode including a Book mode and a Computer Forms Feeder (CFF)

mode are also provided, the latter to accommodate documents in the form of computer fanfold.

Printer section 8 comprises a laser type printer and for purposes of explanation is separated into a Raster Output Scanner (ROS) section 87, Print Module Section 95, Paper Supply section 107, and Finisher 120. ROS 95 has a laser, the beam of which is split into two imaging beams each of which are modulated in accordance with the content of the input image signal and scanned across a moving photoreceptor (not shown) of Print Module 95 to create a latent electrostatic image. Subsequently, the latent image is developed and transferred to a print media (not shown) delivered by Paper Supply section 107. Moreover, the print media may comprise any of a variety of sheet sizes, types, and colors. The developed image transferred to the print media is permanently fixed or fused by a fusing operation (not shown) and discharged to either output tray 98, finisher 120, or to signature finisher section 10. Finisher 120 includes a stacker with stapler for stapling the prints together into large collated documents and a thermal binder 124 for adhesively binding the prints into books.

Figure 3A:
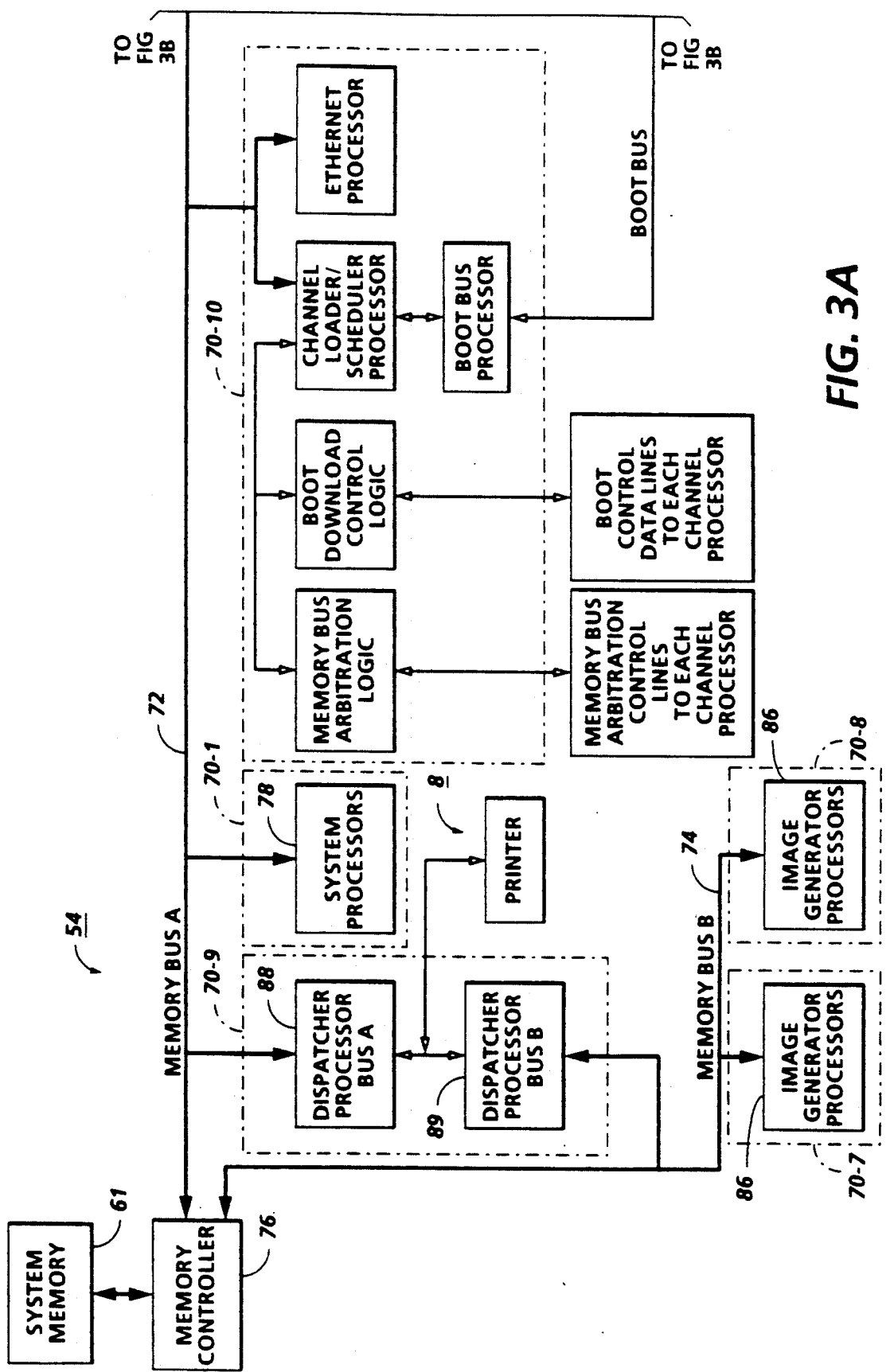
FIGS. 3A–3C comprise a schematic block diagram showing the major parts of the system control section.
Figure 3B:
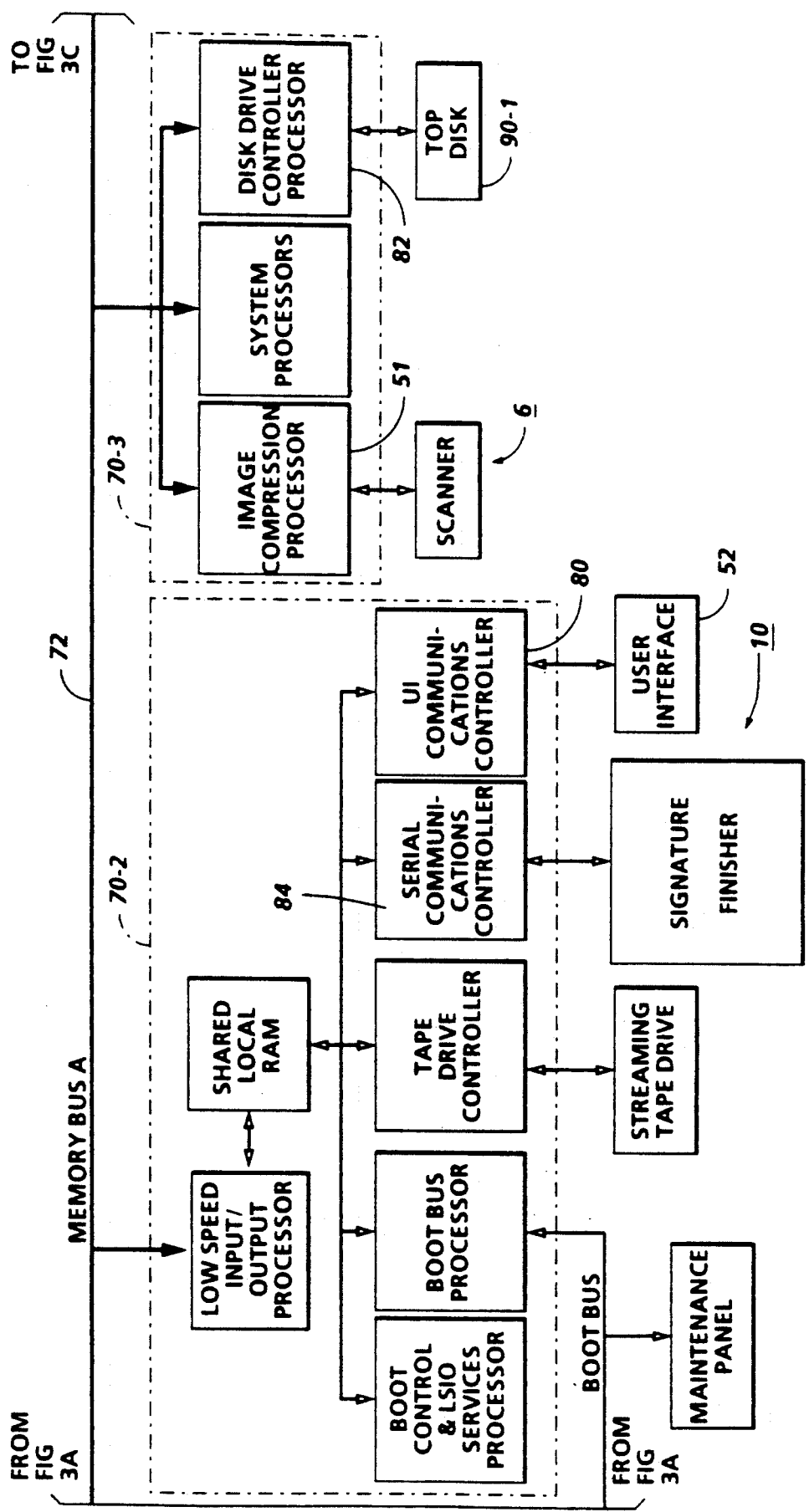
Figure 3C:
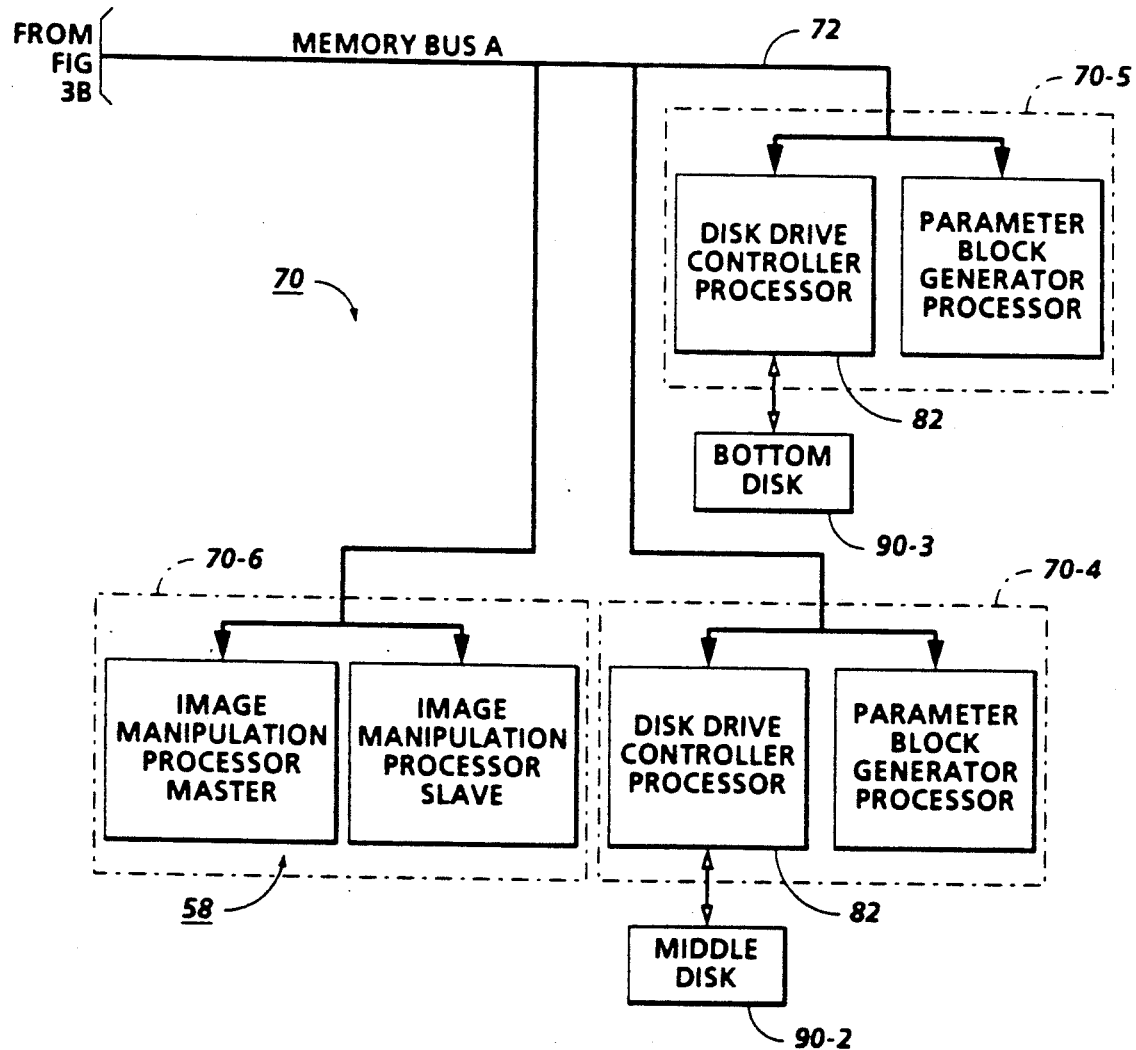

Referring to FIG. 2 in conjunction with FIGS. 3A-C, controller section 7 is, for explanation purposes, divided into an image input controller 50, User Interface (U/I) 52, system controller 54, main memory 56, image manipulation section 58, and image output controller 60. The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

Referring again to FIG. 2, signature finisher section 10 comprises signature set stitcher 10a, signature set folder 10b, and signature set trimmer 10c. Stitcher 10a is used to mechanically fasten all printed media sheets associated with a signature booklet. For example, stitcher subsystem 10a may be used to staple or stitch the collated signature sets in a saddle-stitch fashion. Subsequently, the stitched signature set would be folded, along the stitch line, by folder subsystem 10b in preparation for final trimming of the set. Generally, cutter subsystem 10c will trim the outer edge, opposite the folded edge, in order to square the outer edge of the signature booklet. Alternatively, cutter subsystem 10c might trim all three non-folded edges to square the unbound edges and reduce the size of the finished signature booklet.

Signature finisher section 10 is an illustrative example of a series of subsystems that may be added to a base printing system, comprises of sections 6, 7, and 8, to add functionality to the base system. Furthermore, an add-on subsystem, such as signature finisher 10, may be sold as an option to the base system or added at a later time. More importantly, the add-on subsystem may not be conceived or designed at the time that the base system is first introduced to the market. For this reason, it is important for the base system to enable integration of add-on subsystems which are undefined at the time of initial production of the base system. In order to capture the additional functionality of the add-on subsystems, the base machine must allow for an interface to be established with the subsystems. Moreover, in accordance with the present invention, the base system would include means for accessing any diagnostic capability contained within the subsystems. Therefore, the discussion hereinafter directed towards signature finisher 10 and its associated subsystems (10a-c), is intended to be representative of the interface between the base system and any peripheral subsystems.

As best seen in FIG. 1A, U/I 52 includes a combined operator controller/CRT display consisting of an interactive touchscreen 62, keyboard 64, and mouse 66. U/I 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item or icon on screen 62 with a finger or by using mouse 66 to point a cursor to the item desired for selection and keying the mouse.

Main memory 56 has plural hard disks 90-1, 90-2, 90-3 for storing machine Operating System software, machine operating data, and the scanned image data currently being processed. When the compressed image data in main memory 56 requires further processing, or is required for display on touchscreen 62 of U/I 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to U/I 52 for display on touchscreen 62, or sent to image output controller 60.

Image data output to image output controller 60 is decompressed and readied for printing by image generating processors 86 of PWBs 70-7, 70-8 (seen in FIG. 3A). Following this, the data is output by dispatch processors 88, 89 on PWB 70-9 to printer section 8. Image data sent to printer section 8 for printing is normally purged from memory 56 to make room for new image data.

Referring particularly to FIGS. 3A-3C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having serial communications controller 84 for communicating with peripheral subsystems such as signature finisher 10; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 4:
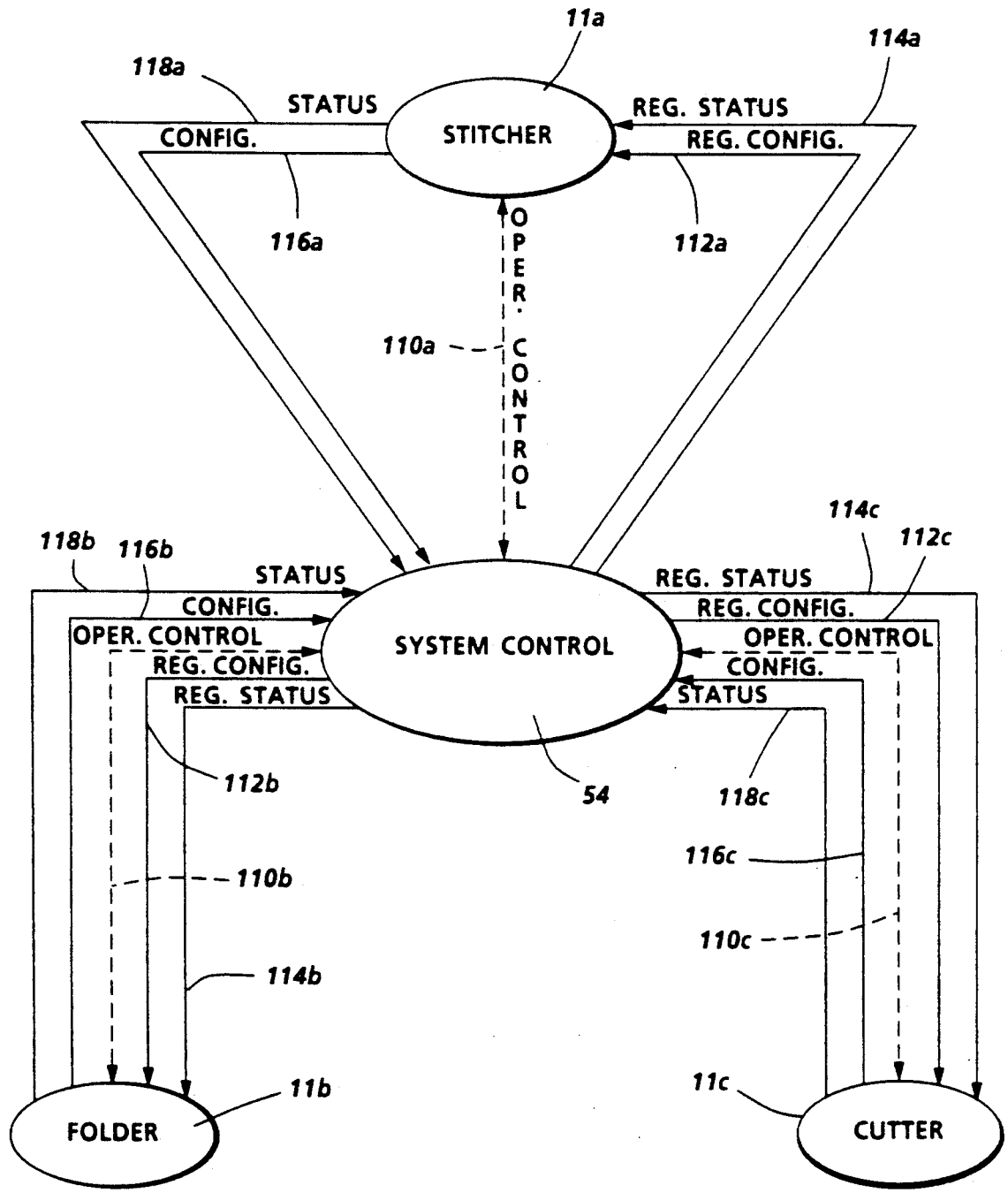
FIG. 4 is a flow diagram illustrating the flow of pertinent information between the base and peripheral subsystems of the electronic printing system of FIGS. 1A and 1B.

Referring now to FIG. 4, which displays the flow of diagnostic and control information in the integrated system, system control 54 of the base machine operationally controls the function of the subsystems via control flow 110. More specifically, the control information required for operation of the peripheral subsystems is implemented by directly linking system control 54 with the control hardware (e.g. microcontroller) associated with each of the peripheral subsystems. In general, the control information required for operation of the peripheral subsystems would dictate the type of physical interface connections between microcontrollers 11 and system control 54. In addition, system control 54 might also be used to effect the operation of individual components contained with in the subsystems, whereby these components would normally be under the control of subsystem microcontroller 11. It should be noted that FIG. 4 displays the connection of the subsystems comprising signature finisher section 10 in a star type configuration. This configuration is illustrative of only one of numerous potential configurations for the peripherals and should not be construed as a limitation of the present invention.

In accordance with the present invention, system control 54 would also initiate configuration and status information transfers with the subsystems via microcontrollers 11a-c. After being placed in a diagnostics mode, system control 54 would be capable of sending configuration request signal 112 to any of the peripheral subsystems. Such a request would signal the subsystem to transmit its configuration back to system control 54. For example, after receiving configuration request signal 112b from system control 54, folder microcontroller 11b would return the configuration of the folder subsystem as indicated by data flow 116b. Specifically, the configuration information would contain the name of the subsystem, as well as, the name and type of all electrical components within the subsystem. Examples of the component types may comprise motors, solenoids, and sensors.

Upon receiving the electrical component configuration for folder subsystem 11b, system control 54 would allocate sufficient space within system memory 61 to store the component information transmitted by folder subsystem 10b. In addition, space would be allocated within each component record to record the control state or status for each component As an example, the record for the main drive motor of folder subsystem 10b could include the following information:
Subsystem Name: Folder
Component Name: Main Drive
Component Type: DC Motor
Control State: ON The actual records stored within system control 54 would represent the above information in a compressed format so as to reduce the storage requirements for the component records.

Subsequent to establishing component records for each of the components contained within a subsystem, system control 54 would again signal folder microcontroller 11b, via data flow 114b, requesting the status or control state of each of the components. Folder microcontroller 11b would then respond by indicating the status or control state for each of the components, as indicated by control flow 118b. Generally, system control 54 would then, via the request status signal, be able to periodically determine the status of all components within subsystem 10b. Alternatively, folder microcontroller 11b might automatically send, on a periodic or as-necessary basis, the status of the components contained within subsystem 10b. The aforedescribed control and data flows would enable system control 54 to initiate the operation of any component identified within subsystem 10b, thereby facilitating the operation and testing of components whose functionality is in question.

Figure 5:
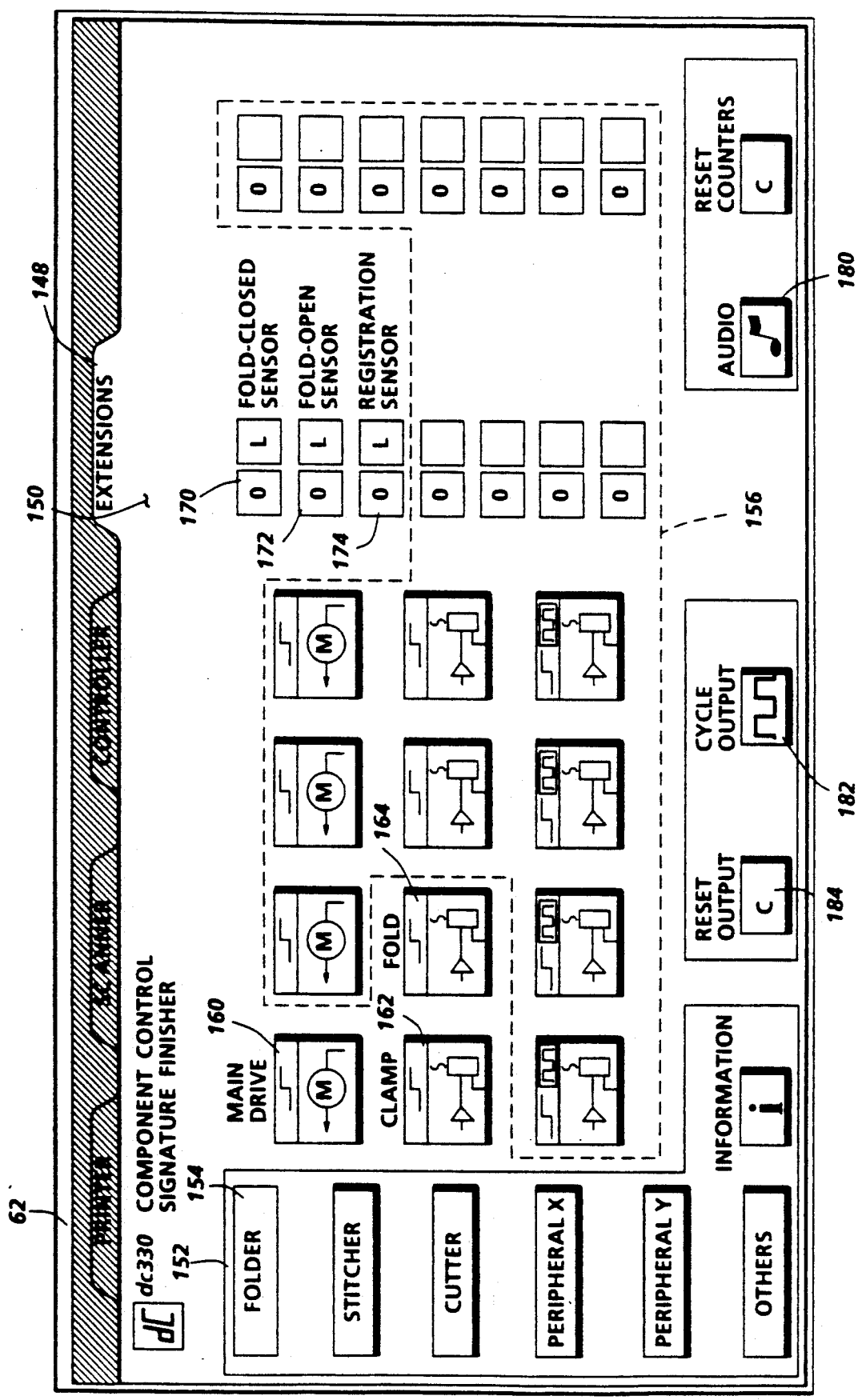
FIG. 5 illustrates a representative User Interface (U/I) screen associated with the component control diagnostic capabilities of the present-invention.

Upon initiating the diagnostics mode for system control 54, U/I 52 of FIG. 1A might display the screen illustrated in FIG. 5. Referring now to FIGS. 4 and 5, touchscreen 62 represents a diagnostic window associated with subsystems that are extensions to the base machine, as indicated by tab 148. Upon selecting tab 148, and opening window 150, a service representative would be able to select the diagnostic screen associated with any of the product extension subsystems shown in scorecard area 152. More specifically, the service rep might select Folder icon 154, causing window 150 to appear as indicated in FIG. 5. As folder subsystem 10b might not have all the possible components that are controllable from window 150, any unused icons (e.g. those) would be unselectable. Alternatively, the icons within area 156 might not even be displayed on the user interface. Identification of those icons which will be selectable would be accomplished in accordance with the component configuration data returned from the appropriate subsystem.

In the present example, folder subsystem 10b has only three active components. The main drive is represented by motor icon 160, while the clamping and folding solenoids are represented by icons 162 and 164, respectively. Also in the present example, there are three sensors, represented by status icons 170, 172 and 174. In general, the status icons are intended to represent the current state of the sensor associated with the icon, thereby providing a visual indication of the binary state of the sensor, as well as, an indication of whether the sensor is an active high or active low sensor.

During a diagnostic session, a service rep would be able to access the component control features of the subsystem via diagnostic window 150. By selecting one or more of the active component icons (e.g. 160, 162 and 164) the service rep would be able to cause the component to operate. For example, selecting Main Drive icon 160, would cause system control 54 to send a control signal to folder microcontroller 11b, which would in turn cause the activation of the main drive within folder subsystem 10b. Upon activating the main drive, the service rep could verify whether or not the the main drive was operating as intended. In a similar fashion, the operation of any other component within the subsystem could be verified.

The service rep would also be able to check the function of the sensors contained within the subsystem. By actuating the sensors while observing the user interface display, the service rep could determine if the sensor was operational. In order to facilitate this diagnostic mode, diagnostic window 150 also has audio button 180, which would enable an audible tone to be emitted from the U/I whenever one of the subsystem sensors, from the currently selected subsystem, changed state. Additional functionality may be incorporated in the diagnostic window to aid the service rep in the troubleshooting of the peripheral subsystems. Specifically, these features include cycle outputs button 182 which will cause the cycling of outputs for the currently selected electromechanical components, or reset outputs button 184, which will reset all outputs to a predefined control state determined by the subsystem microcontroller.

While not specifically illustrated, it is intended that diagnostic window 150 represents a common or generic window which would be suitable for representing a range of electromechanical components that might be included in peripheral subsystems. By doing this, the base machine only needs to store one diagnostic window display in system memory 61, activating the areas and icons of the window as appropriate. Upon receiving configuration data flow 116 from the subsystems, system control 54 would be capable of identifying those areas and icons of diagnostic window 150 which should be enabled for execution of the component control diagnostic capabilities. Therefore, in accordance with the present invention, no prior knowledge of the peripheral subsystem is required to implement the common or generic diagnostic capabilities. Moreover, a service rep need only familiarize himself or herself with the interactions of a single set of diagnostics windows that would be essentially the same for all subsystems.

In addition, the present invention is not necessarily limited to reprographic machines and associated peripheral devices, but may be extensible to any electromechanical systems. In general, the major requirement for the use of the present "generic" diagnostic technique is the adherence to a predefined method of interfacing the base machine to all peripheral subsystems diagnostic capabilities.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. An electromechanical system, comprising:
    a peripheral device whose operation is controllable by the electromechanical system;
    means for communicating with said peripheral device to control the operation thereof;
    means for receiving information from said peripheral device, thereby identifying components within said peripheral device;
    means for determining the status of the components within said peripheral device;
    means for indicating the status of said components; and
    interactive means for displaying representations of said components, including said status of the components, whereby said interactive means facilitates the selection and exercise of said components and includes:
        a user interface, display suitable for displaying iconic representations of machine components common to said peripheral devices, and having means for selecting said iconic representations; and
        control means, responsive to the selection of an iconic representation, for communicating a desired operating state to an operable component of said devices.

2. The electromechanical system of claim 1 wherein said peripheral device further comprises:
    means, responsive to said electromechanical system, for transmitting data records representative of the components contained within the peripheral device to said electromechanical system;
    means, responsive to said electromechanical system, for transmitting data representative of the status of a sensory component contained within the peripheral device; and
    means, responsive to said electromechanical system, for individually controlling the operational state of the components contained within the peripheral device.

3. A reprographic system having a device whose function is integrated therewith, comprising:
    means for communicating with the device;
    means for receiving information indicating components contained within said device;
    means for determining the status of said components;
    means for indicating the status of said components;
    interactive means for displaying representations of said components, including the status of said components, whereby said interactive means facilitates the selection and exercise of said components and includes:
        a user interface, display suitable for displaying iconic representations of components common to a plurality of devices, said user interface having means for selecting said iconic representations; and
        control means, responsive to the selection of an iconic representation, for communicating a desired operating state to said components of the device.

4. The reprographic system of claim 3 wherein said device further comprises:
    means, responsive to said communicating means, for transmitting data records representative of the components contained within the device to said reprographic system;
    means, responsive to said communicating means, for transmitting data representative of the status of a sensory component contained within the device; and
    means, responsive to said communicating means, for individually controlling the operational state of the components contained within the device.

* * * * *